United States Patent [19]

Kawamura et al.

[11] Patent Number: 4,540,761

[45] Date of Patent: Sep. 10, 1985

[54] OXYGEN-PERMEABLE HARD CONTACT LENS

[75] Inventors: Kazunori Kawamura, Akishima; Shinichi Yamashita, Ohme; Yuichi Yokoyama, Kunitachi; Makoto Tsuchiya, Tokyo, all of Japan

[73] Assignee: Hoya Lens Corporation, Kowada, Japan

[21] Appl. No.: 598,283

[22] PCT Filed: Jul. 25, 1983

[86] PCT No.: PCT/JP83/00237

§ 371 Date: Mar. 19, 1984

§ 102(e) Date: Mar. 19, 1984

[87] PCT Pub. No.: WO84/00619

PCT Pub. Date: Feb. 16, 1984

[30] Foreign Application Priority Data

Jul. 27, 1982 [JP] Japan ................... 57-130836

[51] Int. Cl.$^3$ .................. C08F 214/18; G03B 21/46
[52] U.S. Cl. ................. 526/245; 351/160 R; 351/160 H; 523/107; 526/279
[58] Field of Search ............... 526/245, 279; 351/160 R, 160 H; 523/107

[56] References Cited

U.S. PATENT DOCUMENTS 4,419,505 12/1983 Ratkowski et al. ............... 523/107
4,433,111 2/1984 Tighe et al. ..................... 526/245
4,433,125 2/1984 Ichinohe et al. ................. 523/107

*Primary Examiner*—Harry Wong, Jr.
*Attorney, Agent, or Firm*—Bert J. Lewen; Henry Sternberg

[57] ABSTRACT

The oxygen-permeable hard contact lens of this invention produced by polymerizing in a composition composed of 30 to 50% by weight of an alkyl (meth)acrylate, 10 to 40% by weight of a fluorine-containing monomer, 10 to 35% by weight of a silicone (meth)acrylate, 5 to 15% by weight of an unsaturated carboxylic acid and 0.1 to 15% by weight of a di- or tri(meth)acrylate of a dihydric or higher hydric alcohol by raising a temperature continuously or stepwise from 40° to 100° C. and processing the resulting polymer into a lens shape by ordinary mechanical processing and polishing, is excellent in stain resistance, scratch resistance and hydrophilicity.

1 Claim, No Drawings

OXYGEN-PERMEABLE HARD CONTACT LENS

TECHNICAL FIELD

This invention relates to an oxygen-permeable hard contact lens. More particularly, it relates to an oxygen-permeable hard contact lens excellent in stain resistance, scratch resistance and hydrophilicity.

BACKGROUND ART

As materials for hard contact lenses polymethylmethacrylate has hitherto been used widely for their excellency in optical properties, physical strength and mechanical processability. However, polymethylmethacrylate has very low oxygen permeability and therefore oxygen supply to ectocornea through these contact lenses can hardly be expected. Accordingly, in case of using these contact lenses for long hours or sleeping with these contact lenses put on, cornea comes to be short of oxygen causing at times congestion, edema and other cornea disorders. Being an avascular tissue, cornea receives supply of the oxygen necessary for metabolism from the oxygen dissolving in lacrima covering the front surface of cornea. Since hard contact lenses generally have a size covering about half the area of cornea, oxygen supply to cornea is made by (a) lacrima exchange at the backside of lens by the pumping action of lens and (b) the lacrima at the cornea part not covered by lens. As a matter of course, it is desirable for the metabolism of cornea that lens materials themselves have high oxygen permeability and, through hard contact lenses made of these materials, oxygen by supplied to cornea.

In recent years, with a view to replace conventional hard contact lenses mainly composed of polymethylmethacrylates and to provide lenses capable of supplying oxygen to cornea through lenses by using lens materials of high oxygen permeability, there have been disclosed (a) a silicone methacrylate type hard contact lens, namely, a hard contact lens whose oxygen permeability has been enhanced by introducing a siloxane bond to the ester portion of a methacrylic acid ester (Japanese Patent Publication No. 33502/1977), (b) an oxygen-permeable hard contact lens mainly composed of a cellulose such as cellulose acetate butylate (CAB) and (c) an oxygen-permeable hard contact lens using a fluorine-containing methacrylate (Japanese Laid-Open Patent Application No. 51705/1982). In general, oxygen-permeable hard contact lenses mainly composed of silicone methacrylates such as disclosed in Japanese Patent Publication No. 33502/1977, have oxygen permeability higher by several tens to several hundreds times compared with conventional hard contact lenses mainly composed of polymethylmethacrylate, but are usually inferior to them in hardness and hydrophilicity and further tend to pick up stains of lipids and the like. Generally, oxygen-permeable hard contact lenses mainly composed of silicone methacrylates are copolymers between a silicone methacrylate and a methyl methacrylate and, when the proportion of the silicone methacrylate becomes higher, these contact lenses will have improved oxygen permeability but reduced hardness, higher possibility of scratch formation during handling and worsened polishability. Further, their hydrophilicity becomes worse and therefore their hydrophobicity is increased, and consequently their wettability by water is deteriorated resulting in higher, tendency of adsorbing up lipids such as lecithin and the like, and resultantly oxygen-permeable hard contact lenses containing higher contents of silicone methacrylates are liable to adsorb more easily. Since oxygen-permeable hard contact lenses mainly composed of silicone methacrylates have poor wettability by water which is characteristic of silicone, among these lenses there are those whose surface have been treated so as to have higher hydrophilicity. However, this treated surface layer having higher hydrophilicity is as very thin as 1/1000 the lens thickness and accordingly the hydrophilicity is gradually lost during use of lens necessitating, in cases, surface retreatment for higher hydrophilicity.

The present inventors previously found out in Japanese Laid-Open Patent Application No. 51705/1982 that an oxygen-permeable hard contact lens can be obtained from a copolymer comprising a fluorine-containing monomer. However, further improvements in oxygen permeability, surface hardness and hydrophilicity have been desired for this contact lens.

A hard contact lens made of cellulose acetate butylate is somewhat superior in oxygen permeability and hydrophilicity compared with conventional hard contact lenses made of polymethylmethacrylate, but has small hardness and therefore is damaged more easily and consequently lens parameters are liable to change during use of the lens.

DISCLOSURE OF THE INVENTION

In view of the above circumstances, the present inventors made extensive studies for development of a hard contact lens free from the drawbacks of conventional oxygen-permeable hard contact lenses, having high oxygen permeability, and being excellent in stain resistance, scratch resistance (surface hardness) and hydrophilicity. As a result, this invention has been accomplished.

That is, an object of this invention is to provide an oxygen-permeable hard contact lens excellent in stain resistance, scratch resistance and hydrophilicity.

The oxygen permeable hard contact lens according to this invention can be obtained by polymerizing in a mold a composition composed of 30 to 50% by weight of an alkyl (meth)acrylate, 10 to 40% by weight of a fluorine-containing monomer, 10 to 35% by weight of a silicone (meth)acrylate, 5 to 15% by weight of an unsaturated carboxylic acid and 0.1 to 15% by weight of a di- or tri(meth)acrylate of a dihydric or higher hydric alcohol by a continuous or stepwise temperature raising method of 40° to 100° C. and processing the resulting copolymer into a lens shape by standard methods of machining and polishing. The (meth)acrylate in the above description refers to both acrylate and methacrylate.

BEST MODE FOR CARRYING OUT THE INVENTION

In the oxygen-permeable hard contact lens of this invention, by using a fluorine-containing monomer such as trifluoroethyl (meth)acrylate, pentafluoroisopropyl (meth)acrylate or the like and further by adding a silicone (meth)acrylate to enhance oxygen permeability, not only oxygen permeability is improved but also hardness is increased unexpectedly by a synergism with the effect of an crosslinking agent and improvement in the uninformity of the polymer obtained. Hence, the oxygen-permeable hard contact lens of this invention is superior in hardness to conventional copolymers of a fluorine-containing monomer and an alkyl methacrylate and copolymers of a silicone monomer and an alkyl methacrylate, and possesses remarkably improved scratch resistance. Further, owing to the effect of the fluorine-containing monomer, the contact lens of this invention adsorbs stains such as proteins, lipids and the like present in lacrima, in a less quantity, compared with conventional oxygen-permeable hard contact lenses mainly composed of silicone methacrylates. As the fluorine-containing monomer, there are used perfluoroaklyl methyl (meth)acrylates such as trifluoroethyl (meth)acrylate, pentafluoroisopropyl (meth)acrylate, heptafluorobutyl (meth)acrylate, hexafluoroisopropyl (meth)acrylate and the like in a quantity of 10 to 40% by weight. These compounds can be used alone or in combination of two or more. The effect of the fluorine-containing monomer is, as aforementioned, to give the obtained polymer improved uninformity and clarity and enhanced stain resistance together with other copolymerizable components of this invention and at the same time to provide increased hardness and accordingly improved scratch resistance, mechanical processability and polishability while retaining high oxygen permeability. Particularly improvements in scratch resistance, mechanical processability and polishability owing to its increased hardness were suprisingly high contrary to the level anticipated at the early stage. When the fluorine-containing monomer is used in a quantity less than the range mentioned earlier, the above effect does not appear. When it is used in a quantity more than the above range, the hardness of the polymer obtained tends to decrease. Particularly preferable fluorine-containing monomers are those having a small molecular weight and possessing a trifluoromethyl group at the end such as trifluoroethyl (meth)acrylate, hexafluoroisopropyl (meth)acrylate and the like. Although, in co-polymers of a silicone (meth)acrylate and an alkyl (meth)acrylate, as the proportion of the former monomer increases, cloudiness and/or striae appear, such cloudiness and/or striae do not appear in copolymers of a fluorine-containing monomer and an alkyl (meth)acrylate even if the proportion of the former monomer is increased. Similarly, in copolymers of a fluorine-containing monomer, an alkyl (meth)acrylate and a silicone (meth)acrylate, cloudiness and/or striae do not appear, and optically uniform and clear copolymers are produced. Hence, addition of the silicone (meth)acrylate as a polymer component is very advantageous in improving the oxygen permeability of a polymer.

Representative as the alkyl (meth)acrylate are methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, etc. These monomers are used in the range of 30 to 50% by weight and enhance mechanical processability, polishability and optical stability of the polymer obtained. The use of methyl (meth)acrylate is preferable.

The unsaturated carboxylic acid is a polymerizable monomer containing carboxylic group, and acrylic acid and methacrylic acid are representative. This component has an effect of imparting hydrophilicity to contact lens material, and effectively enhances the surface hydrophilicity of contact lenses particularly when the contact lenses are immersed in water. In the case of using methacrylic acid in this invention, it has been found out that this acid not only enhances hydrophilicity but also contributes to increase of hardness. The unsaturated carboxylic acid is used in a quantity of 5 to 15% by weight. When it is used in a quantity of less than 5% by weight, sufficient hydrophilicity can not be obtained. When it is used in a quantity of more than 15% by weight, the copolymer obtained has cloudiness and/or brittleness. Preferably methacrylic acid is used. Monomers which have been known for enhancing hydrophilicity such as 2-hydroxyethyl methacrylate, vinylpyrrolidone, acrylamide, methacrylamide and the like may further be added.

The silicone (meth)acrylate is a component to be added for further enhancing oxygen permeability. Examples are tris(trimethylsiloxy)silylpropyl(meth)acrylate, triphenyldimethyldisiloxanylmethyl(meth)acrylate, pentamethyldisiloxanylmethyl(meth)acrylate, tert-butyltetramethyldisiloxanylethyl(meth)acrylate, methyldi(trimethylsiloxy)silylpropylglyceryl(meth)acrylate and the like. These compounds each are a monomer having siloxane bond at the ester portion of a (meth)acrylic acid ester. Higher siloxane bond content in monomer and higher degree of branching in siloxane bond gives a higher contribution to oxygen permeability, but at the same time tends to incur decrease of hardness. Hence, care must be taken in selection of monomer and determination of its quantity. The silicone (meth)acrylate is used in a quantity of 10 to 35% by weight but its quantity should be controlled at a necessary minimum in consideration of decrease of hardness and higher possibility of staining with lipids and the like.

The di- or tri(meth)acrylate of a dihydric or higher hydric alcohol is a crosslinking agent and a component contributing to structural stability and increase of hardness of the copolymer obtained. Examples are di(meth)acrylates of ethylene glycol, diethylene glycol, triethylene glycol, tetraethylene glycol, propylene glycol and butylene glycol; trimethylolpropane tri(meth)acrylate; and the like. These compounds are used in the range of 0.1 to 15% by weight. Besides, there may be used, for example, diallyl phthalate, diallyl isophthalate, triallyl cyanurate, triallyl isocyanurate, divinylbenzene, bisphenol A dimethacrylate, diethylene glycol bisallylcarbonate and the like.

As the initiator for polymerizing the above components, there are used ordinary free radical-forming reagent or initiators such as, for example, benzoyl peroxide, lauroyl peroxide, cumene hydroperoxide, di-tert-butyl peroxide, bis-(4-tert-butyl cyclohexyl)peroxydicarbonate, diisopropyl peroxydicarbonate, 2,2'-azobisisobutylonitrile, 2,2'-azobis-2,4-(dimethylvaleronitrile) and the like. The use of a polymerization initiator forming a radical at low temperatures is preferable.

In this invention, the above mentioned monomer components are mixed and then poured into a mold made of a metal, glass, a plastic or the like, and polymerization is completed in a closed condition by adopting a continuous stepwise temperature raising method of 40° to 100° C., and the polymer obtained is processed into a lens shape by ordinary mechanical processing and polishing. The oxygen-permeable hard contact lens thus formed is superior in stain resistance, scratch resistance and hydrophilicity to conventional oxygen-permeable lenses mainly composed of silicone methacrylates and further superior in optical clarity and uniformity of lens. In addition, since the copolymer obtained according to this invention has excellent machinability and polishability when the copolymer is mechanically processed into a lens shape, it can be easily processed into a desired lens dimension and a lens with excellent dimensional stability can be obtained. These advantages are brought about as a result of the fact that superior points of each copolymerizing component are sufficiently utilized and thereby inferior points of these components are offset. Accordingly, the hard contact lens of this invention is very significant in that it is equipped with various properties not obtainable with conventional oxygen-permeable hard contact lenses.

Hereinunder, Examples of this invention are shown.

EXAMPLE 1

45 Parts by weight of methyl methacrylate, 30 parts by weight of trifluoroethyl methacrylate, 15 parts by weight of tris(trimethylsiloxy)silylpropylmethacrylate, 5 parts by weight of methacrylic acid, 5 parts by weight of trimethylolpropane trimethacrylate and 0.3 part by weight of azobisisovaleronitrile as polymerization initiator were mixed thoroughly. The resulting mixture was placed in a high density polyethylene tube and the tube was sealed after replacing the inside gas with nitrogen. Then, the tube was subjected to heating for 24 hr in a water bath of 40° C., for 12 hr in a electric over of 60° C. and for 10 hr in the same oven increased to 100° C. to copolymerize the contents. The copolymer obtained was colorless and transparent and optically uniform. Specimens were cut off the copolymer to measure its physical and other properties. As shown in Table 1, this copolymer was an oxygen-permeable material excellent in surface hardness, scratch resistance and stain resistance and good in wettability by water. Using this copolymer, a contact lens was produced by ordinary mechanical processing and polishing. In actual use, this oxygen-permeable hard contact lens gave a very good feeling of use, was difficult to get scars and had excellent durability. Further, in use over a long period of time staining of the lens surface was very minor.

EXAMPLE 2

30 Parts by weight of methyl methacrylate, 30 parts by weight of trifluoroethyl methacrylate, 25 parts by weight of tris(trimethylsiloxy)silylpropylmethacrylate, 10 parts by weight of methacrylic acid, 5 parts by weight of tetraethylene glycol dimethyacrylate and 0.2 part by weight of 2,2'-azobisisobutylonitrile were mixed thoroughly. The resulting mixture was placed in a teflon tube and sealed after replacing the inside gas with nitrogen. The tube was placed in a electric oven and heated for 26 hr at 40° C., for 16 hr at 50° C., for 5 hr at 80° C. and for 6 hr at 100° C. to complete copolymerization. The copolymer obtained was tested for physical properties, in which it showed an oxygen permeability coefficient of $14.2 \times 10^{-10}$ [cc(STP)cm/cm$^2$.sec.cm Hg] and a contact angle of 65° (good wettability by water). Further, a contact lens was produced from this copolymer by mechanical processing. The lens was superior particularly in machinability and polishability. In actual use, this oxygen-permeable hard contact lens, as compared with conventional hard contact lenses, gave a low feeling of foreign matter. Moreover, in use over long hours, staining of the lens surface was very minor.

EXAMPLES 3 to 8

Copolymerization was conducted in the same manner as in Examples 1 and 2 to obtain respective copolymers. Contact lenses were produced by subjecting the copolymesr to mechanical processing. These lenses were all oxygen-permeable hard contact lenses excellent in surface hardness, wear and scar resistance, stain resistance and hydrophilicity. Table 1 shows phsical and other properties of the contact lenses of the above Examples and Comparative Examples.

Oxygen permeability coefficient was measured by the use of a Seikaken type film oxygen permeability tester. The unit is cc(STP)cm/cm$^2$. sec.cmHg.

Surface hardness was shown in Knoop hardness and pencil hardness. Pencil hardness was measured by JIS K 5401.

Contact angle was measured in accordance with the droplet method by the use of an Erma contact anglemeter. The unit is degree.

Scratch resistance was measured by the use of the eraser hardness testing method. A lens having very few scars on the surface was rated as ⊙ , a lens having few scars as ○ and a lens having many scars as x.

Processability is compared with those of hard contact lenses mainly composed of methyl methacrylates. A lens having excellent processability was rated as ⊙ , a lens having good processability as ○ and a lens having poor processability as x.

Transparency was measured by visually checking a copolymer, a plate or a lens. Excellent transparency was rated as ⊙ , good transparency as and poor transparency as x.

Stain resistance was measured by immersing a sample in a liquid containing lacrima components such as proteins, lipids and the like, then washing the sample surface with water and examining stain substances adhered to the sample surface by visual check, microscopic observation and absorbance measurement at ultraviolet wavelengths. A sample having very few stains on the was rated as ⊙, good transparency as ○ and poor transparency as x.

EXAMPLES A to C

In Table 2 there were shown physical and other properties of (1) conventional oxygen-permeable hard contact lens materials produced from methyl methacrylate, tris(trimethylsiloxy)silylpropylmethacrylate, methacrylic acid and tetraethylene glycol dimethacrylate and (2) an oxygen-permeable hard contact lens material produced form the above four components and trifluoroethyl methacrylate as fluorine-containing monomer. The ratios of monomer componnets excluding trifluoroethyl methacrylate in Examples A, B and C correspond to the monomer ratios in Comparative Examples a, b and c, respectively. It is apparent from Table 2 that addition of trifluoroethyl methacrylate improved all tested properties such as oxygen permeability, hardness, scratch resistance, stain resistance and transparency.

It is anticipated generally that addition of a fluorine-containing monomer reduces hardness and increases contact angle for water. However, contrary to the expectation, it was confirmed that, by addition of a fluorine-containing monomer, the silicone methacrylate hitherto employed to enhance oxygen permeability can be used in a smaller quantity and further the uniformity of the copolymer obtained is improved whereby transparency and processability do not deteriorate even if a hydrophilic monomer used to enhance contact angle and hardness, a crosslinking agent and the like are used in large quantities.

TABLE 1

|   | | Parts by weight | Oxygen permeability coefficient $\times 10^{-10}$ | Hardness Knoop | Hardness Pencil | Contact angle for water degree | Scratch resistance | Processability | Stain resistance | Transparency |
|---|---|---|---|---|---|---|---|---|---|---|
| | Comparative Example | | | | | | | | | |
| 1 | MMA/EDMA | 98/2 | 0.1 | 20.0 | 2H | 65 | ○ | ○ | ○ | ○ |
| 2 | MMA/TSPM | 49/51 | 20.1 | 6.8 | N | 78 | x | x | x | x |
| 3 | " | 79/21 | 2.4 | 10.5 | HB | 76 | x | ○ | x | ○ |
| | Examples | | | | | | | | | |
| 1 | MMA/TFEM/TSPM/MA/TMPT | 45/30/15/5/5 | 8.9 | 14.1 | H | 65 | ○ | ○ | ○ | ○ |
| 2 | MMA/TFEM/TSPM/MA/4G | 30/30/25/10/5 | 14.2 | 12.9 | H | 65 | ○ | ○ | ○ | ○ |
| 3 | MMA/PFPM/TSPM/MA/2G | 35/35/20/5/5 | 12.8 | 13.2 | H | 67 | ○ | ○ | ○ | ○ |
| 4 | MMA/HEIPM/TSPM/MA/4G | 30/30/25/10/5 | 17.3 | 12.8 | H | 68 | ○ | ○ | ○ | ○ |
| 5 | MMA/HFIPM/PMSM/MA/TMPT | 40/25/13/10/12 | 9.6 | 13.6 | H | 68 | ○ | ○ | ○ | ○ |
| 6 | MMA/TFEM/TSPM/TBTMS/MM/EDMA | 40/25/15/5/5/10 | 8.4 | 12.7 | H | 66 | ○ | ○ | ○ | ○ |
| 7 | MMA/TFEM/TSPM/TPHESM/MA/TMPT | 40/25/15/5/10/5 | 9.2 | 13.4 | H | 66 | ○ | ○ | ○ | ○ |
| 8 | MMA/TBMA/TFEM/TSPM/MA/4G | 20/20/35/10/5/10 | 10.3 | 11.2 | F | 67 | ○ | ○ | ○ | ○ |

MMA: Methyl methacrylate.
TFEM: Trifluoroethyl methacrylate
HFIPM: Hexafluoroisopropyl methacrylate.
TSPM: Tris(trimethylsiloxy)silylpropyl Methacrylate.
TBMA: Tert-butyl methacrylate.
PFPM: Pentafluoropropyl methacrylate,
PMS: Pentamethyldisiloxanylmethyl methacrylate.
TBTMSM: Tert-butyltetramethyldisiloxanylethyl methacrylate,
TPHESM: Triphenyldimethyldisiloxanylmethyl methacrylate,
MA: Methacrylic acid,
EDMA: Ethylene glycol dimethacrylate.
2G: Diethylene glycol dimethacrylate.
4G: Tetraethylene glycol dimethacrylate.
TMPT: Trimethylolpropane methacrylate

TABLE 2

|   | | Parts by weight | Oxygen permeability coefficient, $\times 10^{-10}$ | Hardness Knoop | Hardness Pencil | Contact angle for water, degree | Scratch resistance | Processability | Stain resistance | Transparency |
|---|---|---|---|---|---|---|---|---|---|---|
| | Comparative Examples | | | | | | | | | |
| a | MMA/TSPM/MA/4G | 47/35/12/6 | 10.1 | 9.7 | HB | 67 | x | x | x | x |
| b | MMA/TSPM/MA/TMPT | 47/35/12/6 | 9.2 | 11.5 | F | 66 | ○ | x | x | x |
| c | " | 57/29/7/7 | 7.9 | 10.8 | HB | 67 | x | x | x | x |
| | Examples | | | | | | | | | |
| A | MMA/TFEM/TSPM/MA/4G | 40/15/30/10/5 | 13.8 | 11.8 | F | 66 | ○ | ○ | ○ | ○ |
| B | MMA/TFEM/TSPM/MA/TMPT | 40/15/30/10/5 | 12.5 | 13.3 | H | 66 | ○ | ○ | ○ | ○ |
| C | " | 40/30/20/5/5 | 10.5 | 13.0 | H | 65 | ○ | ○ | ○ | ○ |

What is claimed is:

1. An oxygen-permeable hard contact lens made of oxygen-permeable, transparent, high molecular weight material produced by polymerizing in a mold a composition comprising:
(a) 30 to 50% by weight of an alkyl (meth)acrylate wherein said alkyl group has from 1 to 4 carbon atoms;
(b) 10 to 40% by weight of a fluorine-containing monomer which is at least one perfluoroalkyl (meth)acrylate selected from the group consisting of trifluoroethyl (meth) acrylate, pentafluoroisopropyl (meth)acrylate, heptafluorobutyl (meth)acrylate and hexafluoroisopropyl (meth)acrylate;
(c) 10 to 35% by weight of a silicone (meth)acrylate which is at least one member selected from the group consisting of tris(trimethylsiloxy)silylpropyl (meth)acrylate, triphenyldimethyldisiloxanylmethyl (meth)acrylate, pentamethyldisiloxanylmethyl (meth)acrylate, tert-butyltetramethyldisiloxanylethyl (meth)acrylate and methyldi(trimethylsiloxy)silylpropylglyceryl (meth)acrylate;
(d) 5 to 15% by weight of at least one unsaturated carboxylic acid monomer selected from the group consisting of acrylic acid and methacrylic acid; and
(e) 0.1 to 15% by weight of at least one monomer selected from the group consisting of (i) di(meth)acrylates of ethylene glycol, diethylene glycol, triethylene glycol, tetraethylene glycol, propylene glycol or butylene glycol and (ii) trimethylolpropane tri(meth)acrylate.

* * * * *